(12) United States Patent
Liss et al.

(10) Patent No.: US 9,037,970 B2
(45) Date of Patent: May 19, 2015

(54) SOCIAL NETWORK SITE INCLUDING INTERACTIVE DIGITAL OBJECTS

(75) Inventors: Harold Alan Liss, San Francisco, CA (US); Ryo Chijiiwa, Cerritos, CA (US)

(73) Assignee: YAHOO! INC., Sunnyvale, CA (US)

( * ) Notice: Subject to any disclaimer, the term of this patent is extended or adjusted under 35 U.S.C. 154(b) by 2012 days.

(21) Appl. No.: 11/853,748

(22) Filed: Sep. 11, 2007

(65) Prior Publication Data

US 2009/0070286 A1    Mar. 12, 2009

(51) Int. Cl.
| | |
|---|---|
| *G06F 3/048* | (2013.01) |
| *G06F 17/00* | (2006.01) |
| *G06Q 10/10* | (2012.01) |

(52) U.S. Cl.
CPC ...................................... *G06Q 10/10* (2013.01)

(58) Field of Classification Search
CPC .............................................. A63F 2300/5553
USPC ......................................... 715/273, 200, 706
See application file for complete search history.

(56) References Cited

U.S. PATENT DOCUMENTS

| | | | |
|---|---|---|---|
| 7,366,990 B2* | 4/2008 | Pitroda ......................... | 715/745 |
| 7,970,657 B2* | 6/2011 | Morgenstern ................ | 705/26.1 |
| 2003/0080989 A1* | 5/2003 | Matsuda et al. .............. | 345/706 |
| 2005/0165785 A1* | 7/2005 | Malkin et al. ................... | 707/10 |
| 2005/0288820 A1* | 12/2005 | Wu et al. ........................ | 700/264 |
| 2009/0100351 A1* | 4/2009 | Bromenshenkel et al. ... | 715/757 |

\* cited by examiner

*Primary Examiner* — Manglesh M Patel

(74) *Attorney, Agent, or Firm* — James J. DeCarlo; Greenberg Traurig, LLP

(57) ABSTRACT

A social network site with enhanced user interaction functionality. In one implementation, a method includes providing a personal page corresponding to a first user, wherein the personal page includes a digital pet module region comprising a representation of an animate object, an indicator of a current state of the animate object, an action selector control, and an action history comprising a user identifier of a previous user and an action selected by the previous user using the action selector control; receiving an indication of a selected action from a current user; modifying the state of a digital pet object based on the selected action; and causing a browser client to render the digital pet module region, the modified state, and an updated action history including an identification of the current user and the action selected by the user.

20 Claims, 20 Drawing Sheets

Data Table

| Owner | Editor | Key | Value | Time Stamp | Status | Difference |
|---|---|---|---|---|---|---|
| S | R | Candy | Candy A | 1 | Obsolete | |
| S | W | Candy | Candy B | 2 | Approved | |
| S | R | Pet | Happy, Feed | 3 | Approved | |
| S | W | Pet | Sad, Poke | 4 | Approved | |
| S | R | Photo | http://... | 5 | Approved | |
| S | W | Layout | String A | 6 | Pending | |
| S | E | Candy | Inappropriate | 7 | Rejected | |

Fig._5

Key Table

| Owner | Key | Label | Module |
|---|---|---|---|
| S | Candy | Favorite Candy | Profile |
| S | School | School | Profile |
| S | Baseball | Favorite Team | Sports |
| S | Photo | My Photos | Sports |

Fig._6

Permissions Table

| Owner | Action | Setting |
|---|---|---|
| S | Edit | |
| S | View | |
| S | Conversation | |

Fig._7

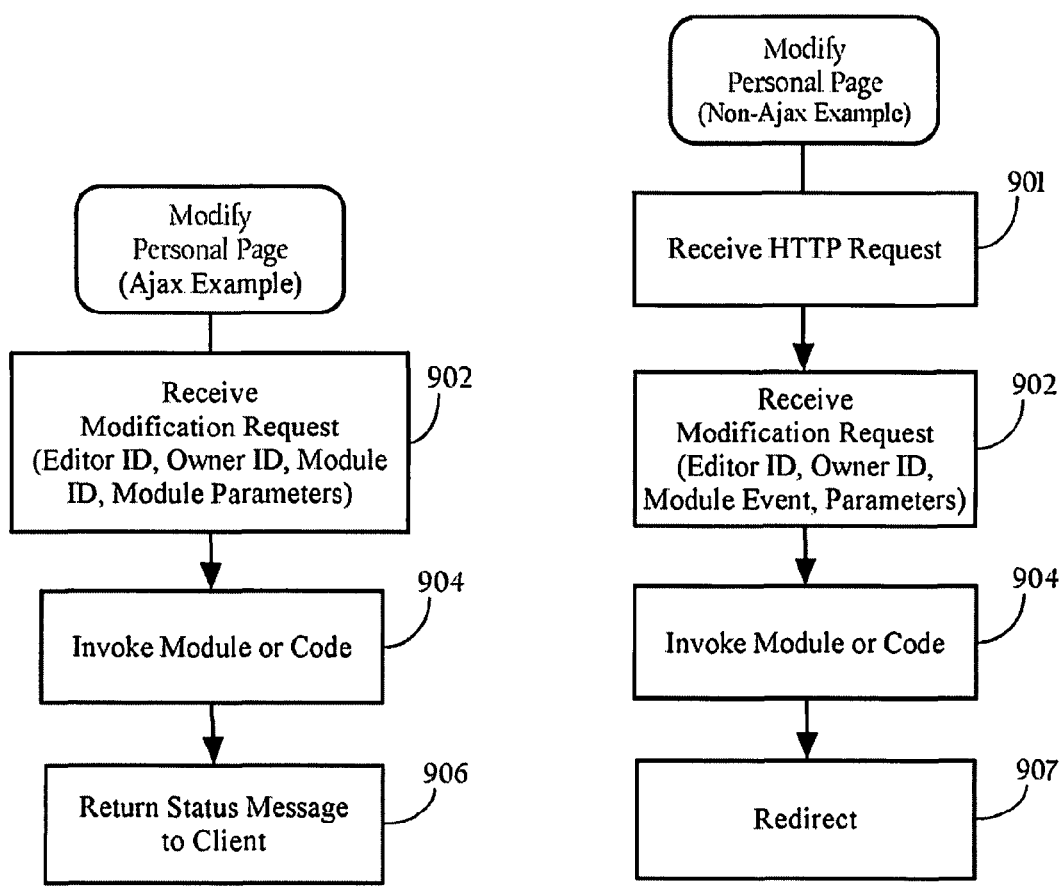
Fig._9A   Fig._9B

Permissions

You have control over the way people interact with your Mosh profile. You decide who can see it, who can add or edit content on your page, and who can have conversations...

Who can see your profile?
- ○ Only you
  - ☐ Your friends
  - ☐ Your family
- ● Anyone

Who can edit your profile?
- ● Only you
  - ☑ Your friends
  - ☑ Your family
- ○ Anyone

Who can participate in your conversations?
- ● Only you
  - ☑ Your friends
  - ☑ Your family
- ○ Anyone Save | Reset | Cancel

Fig. 10

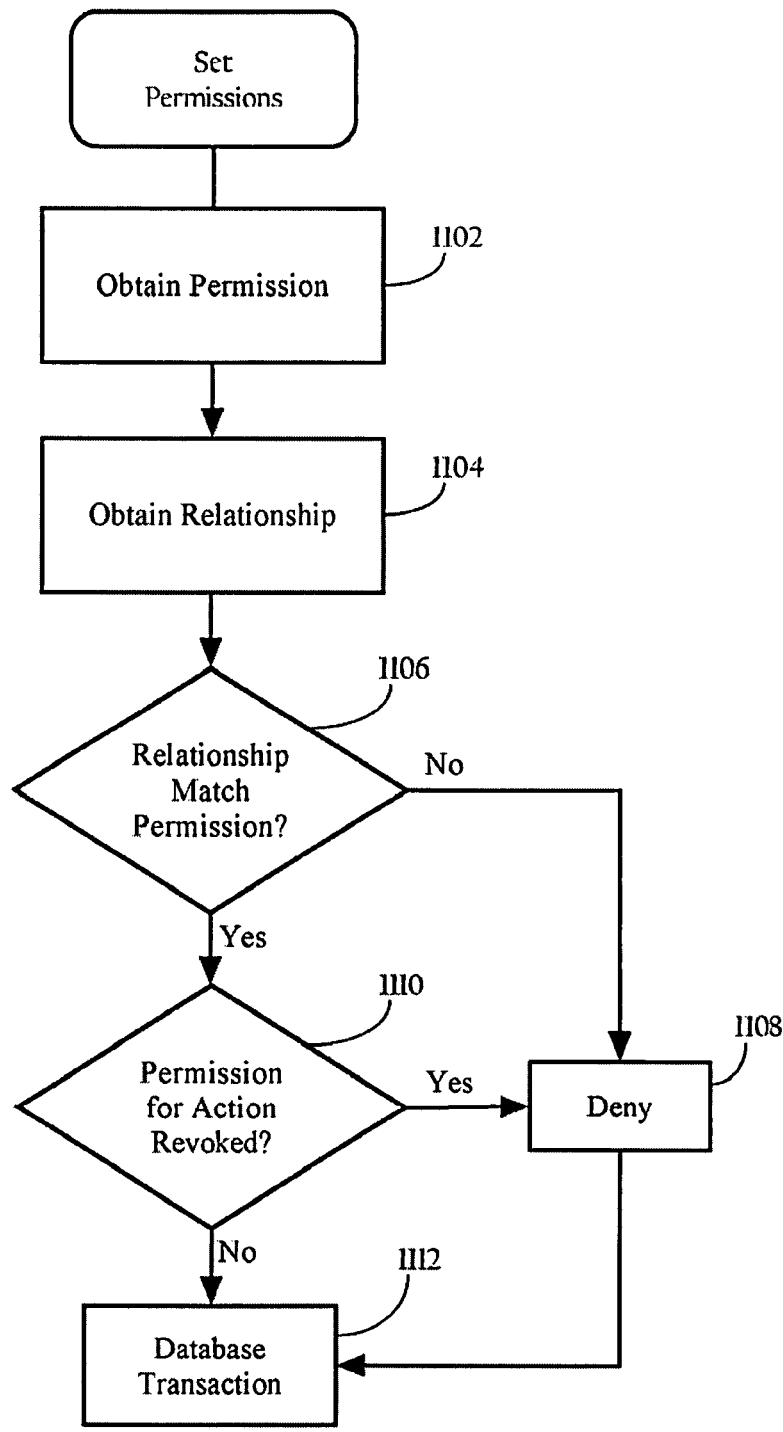
Fig._11

MOSH

Will Aldrich's History

| Time | Event |
|---|---|
| Thu Jul 05 4:11pm | Will Aldrich added a Asteroids module |
| Thu Jul 05 4:08pm | Will Aldrich removed a Music Player Slim module |
| Thu Jul 05 4:08pm | Will Aldrich changed the text color (details) |
| Thu Jul 05 4:07pm | Will Aldrich changed the background (details) |
| Thu Jul 05 4:06pm | Will Aldrich added *Mission July 4th commu...* and removed *Mission Carnaval!!!!* from *Favorite time during the year to stay at home* (details) — approved |
| Thu Jul 05 4:06pm | Will Aldrich added *Linkedin* to My other profiles on the web (details) — approved |
| Thu Jul 05 4:04pm | Will Aldrich changed I'm in the mood for to "*getting moshed*" (details) — approved |
| Thu Jul 05 4:04pm | Will Aldrich changed Favorite candybar to "*michael recchiuti, all of his stuff*" (details) — approved |
| Thu Jul 05 4:03pm | Will Aldrich removed a Music Player Slim module |
| Thu Jul 05 2:40pm | Will Aldrich removed * * from My Stuff (details) — [Reject] [Approve] |
| Thu Jul 05 2:36pm | Ian added a Music Player Slim module |
| Thu Jul 05 2:34pm | Ian wrote a guestbook entry |
| Thu Jul 05 2:32pm | Ian removed a Music Player Slim module |

Fig. 12

| http://staging.mosh.mud.yahoo.com/diff.php?id=8paQHdd1ySGtDlcPyQ&edit_id=983 |

Getting Started   Latest Headlines

> will aldrich

< New Inventions   < Profiles   < YT...   M   Mosh

MOSH   Mosh, but don't tell... Please keep details about Mosh within Yahoo!

MOSH   Your Profile | Pulse | Contacts | Settings | Sudo | Help     Welcome will aldrich [Sign Out, My Account]

On 2007-07-02 00:36:00  Frederique changed mystuff to:
It's time to get Nick started on the crawy frog song, ding ding!<b><object width=."425" height="350"><param name="movie" value="http://www.youtube.com/v/Bgo0ihBb78w"><param><param name="wmode" value="transparent"></param><embed src="http://www.youtube.com/v/Bgo0ihBb78w" type="application/x-shockwave-flash" wmode="transparent" width="425" height="350"></embed></object><br><img src="http://gooey.yahoo.com/gui/prod/yprofiles/MOSH/mosh-aid.jpg"><p><a href="http://mfrost.typepad.com/cute_overload/2006/09/mmmmm_snoutlici.html"><img src="http://mfrost.typepad.com/cute_overload/images/tongue_overload.jpg"></a><a href="http://www.flickr.com/photos/willa/687814421/ title="nick and the bear"><img src="http://farm2.static.flickr.com/1376/687814421_2ed95e2cb8.jpg" width="500" height="375" alt="nick and the bear" /></a>

On 2007-06-30 20:04:09  Will Aldrich changed mystuff to:
<img src="http://gooey.yahoo.com/gui/prod/yprofiles/MOSH/mosh-aid.jpg"><p><a href="http://mfrost.typepad.com/cute_overload/2006/09/mmmmm_snoutlici.html"><img src="http://mfrost.typepad.com/cute_overload/images/tongue_overload.jpg"></a><a href="http://media.imeem.com/m/J_vKzFJYc1/aus=false/"><param name="wmode" value="transparent"></param><object width="300" height="80"><param name="movie" value="http://media.imeem.com/m/J_vKzFJYc1/aus=false/"><param name="wmode" value="transparent"></param><embed src="http://media.imeem.com/m/J_vKzFJYc1/aus=false/" type="application/x-shockwave-flash" width="300" height="80" wmode="transparent"></embed></object>

GET YOUR FRIENDS ON MOSH        MORE YOU CAN DO...
Start a profile for them.            Get Help • Give Feedback • Visit the Module Gallery • Read the MOSH blog

Fig. 13

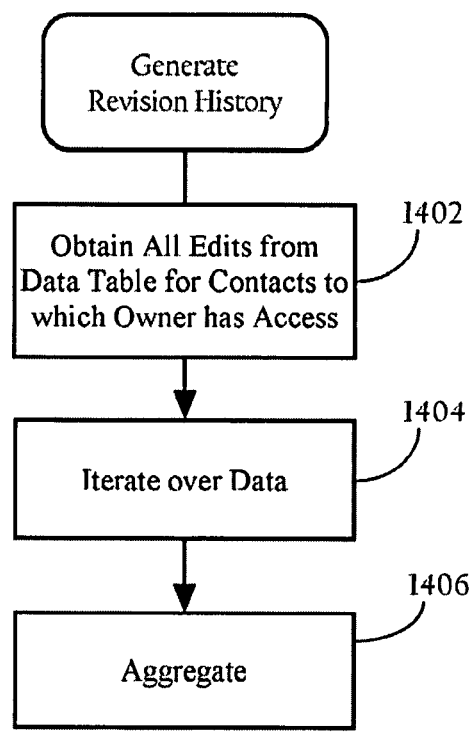
Fig._14

MOSH | Your Profile | Pulse | Contacts | Settings | Sudo | Help

Updates from my contacts (see bluts only)

| | | |
|---|---|---|
| Thu Jul 05 4:37pm | | Mario Anima fed The Mosh Pet on [icon] Bethany del Lima's profile |
| Thu Jul 05 4:37pm | | Mario Anima changed My Stuff to "<embed syc="http://us.l1.ying.co" on [icon] Jamie the friendly designer's profile [icon] Bethany del Lima's profile |
| Thu Jul 05 4:36pm | | Michael Curtis wrote a guestbook entry on [icon] Jamie the friendly designer's profile |
| Thu Jul 05 4:27pm | | Will Aldrich snorgled The Mosh Pet on [icon] Kevin Krim's profile |
| Thu Jul 05 4:11pm | | Will Aldrich added a Asteroids module |
| Thu Jul 05 4:08pm | | Will Aldrich removed a Music Player Slim module. |
| Thu Jul 05 4:08pm | | Will Aldrich changed the text color |
| Thu Jul 05 4:07pm | | Jason wrote a guestbook entry |
| Thu Jul 05 4:06pm | | Anne Toth encountered a hungry pet on [icon] Denptis profile |
| Thu Jul 05 4:05pm | | Anne Toth encountered a hungry pet |
| Thu Jul 05 4:05pm | | Mario Anima added [icon] Randall H to *Contacts*. |
| Thu Jul 05 4:05pm | | Jason wrote a guestbook entry |
| Thu Jul 05 4:04pm | | Haoru answered a question |
| Thu Jul 05 4:02pm | | Jason wrote a guestbook entry on [icon] Kathleen W's profile |
| Thu Jul 05 4:00pm | | Mario Anima added [icon] Anne to *Contacts*. |
| Thu Jul 05 3:59pm | | Jason wrote a guestbook entry on [icon] Jamie the friendly designer's profile |

Fig. 15

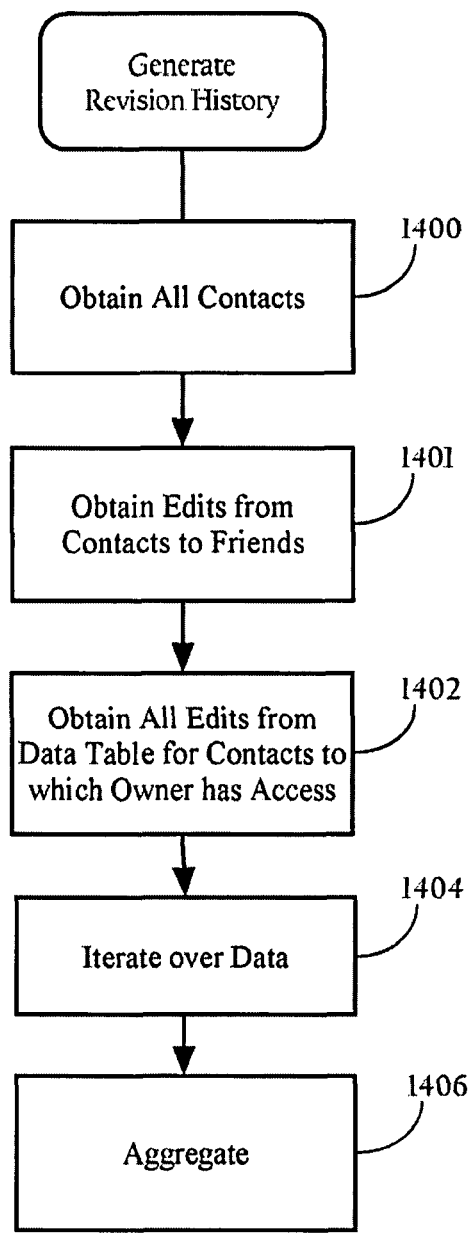
Fig._16

Fig._19

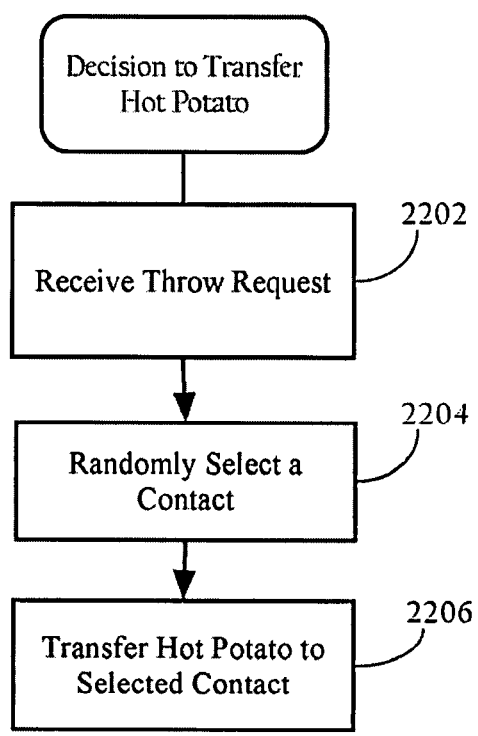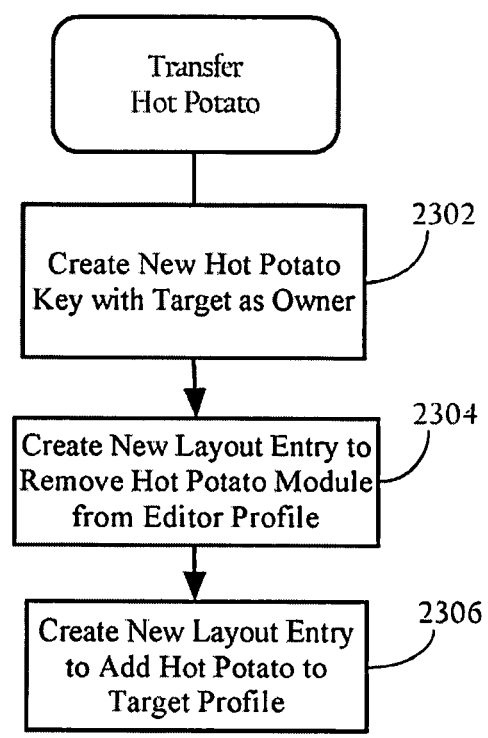
Fig._22        Fig._23

US 9,037,970 B2

SOCIAL NETWORK SITE INCLUDING INTERACTIVE DIGITAL OBJECTS

TECHNICAL FIELD

The present disclosure generally relates to social network sites.

BACKGROUND

Interactive systems connected by wide area networks, such as the Internet, have steadily evolved into vibrant mediums for social interaction. For example, social network sites are fast growing phenomena that provide an interactive medium through which users can grow a network of friends for sharing personal information, as well as for exchanging digital media such as music and videos. Social network sites have become an increasingly influential part of contemporary popular culture around the world. A social network site focuses on the building and verifying of online social networks for communities of people who share interests and activities, or who are interested in exploring the interests and activities of others. Most social network services are primarily web based and provide a collection of various ways for users to interact, such as chat, messaging, email, video, voice chat, file sharing, blogging, discussion groups, and the like.

In general, social networking services, such as MySpace, Facebook and Bebo, allow users to create a profile for themselves. Users can upload a picture of themselves and can often be "friends" with other users. In most social network sites, both users must confirm that they are friends before they are linked. For example, if Alice lists Bob as a friend, then Bob would have to approve Alice's friend request before they are listed as friends. Some social network sites have a "favorites" feature that does not need approval from the other user. Social networks usually have privacy controls that allow the user to choose who can view their profile or contact them. In connection with social network sites, users typically create personalized web pages that display personal information about the users (e.g., name, age, gender, location, etc.). The user may include text, images, photos, and other content to share with other users. The user may periodically add or change content to the personalized web page after it is created.

SUMMARY

The present invention provides a method, apparatus, and systems directed to a social network site with enhanced user interaction functionality. In particular implementations, the present invention provides interactive digital objects that facilitate or stimulate user interaction within a social network site. In one implementation, the social network site provides a pet module. When invoked, the pet module renders an object that is a representation of a living being (e.g., a pet) in a pet module region. In particular implementations, the pet module facilitates social interaction with one another's personal pages by allowing users to interact with the pet. In another implementation, the social network site provides a semi-autonomous digital object that attaches itself to a personal page profile. In a particular implementation, the semi-autonomous digital object manifests itself as a hot potato that obscures one or more regions of a user's personal page. When invoked, the hot potato module renders an object that is a representation of a potato. In particular implementations, the hot potato module facilitates social interaction with one another's personal pages by allowing users to throw the hot potato to other users.

DESCRIPTION OF THE DRAWINGS

FIG. 5 illustrates an example data table.

FIG. 6 illustrates an example key table for a given user.

FIG. 7 illustrates an example permission table for a given user.

FIG. 9A illustrates an example process flow associated with modifying a personal page using Asynchronous JavaScript and XML (Ajax).

FIG. 9B illustrates an example process flow associated with modifying a personal page without using Ajax.

FIG. 10 illustrates an example page for setting permissions of a user profile.

FIG. 11 illustrates a process flow associated with setting permissions.

FIG. 12 illustrates an example page showing a revision history for a particular user.

FIG. 13 illustrates an example page showing details of changes made by particular users.

FIG. 14 illustrates a process flow associated with displaying a revision history.

FIG. 15 illustrates an example page showing updates from all of the contacts of a given user.

FIG. 16 illustrates a process flow associated with displaying a revision history.

FIG. 22 illustrates a process flow associated with a decision to transfer a hot potato.

FIG. 23 illustrates a process flow associated with transferring a hot potato.

DESCRIPTION OF EXAMPLE EMBODIMENTS

A. Example Network System Architecture

A.1. Example Network Environment

Figure 1:
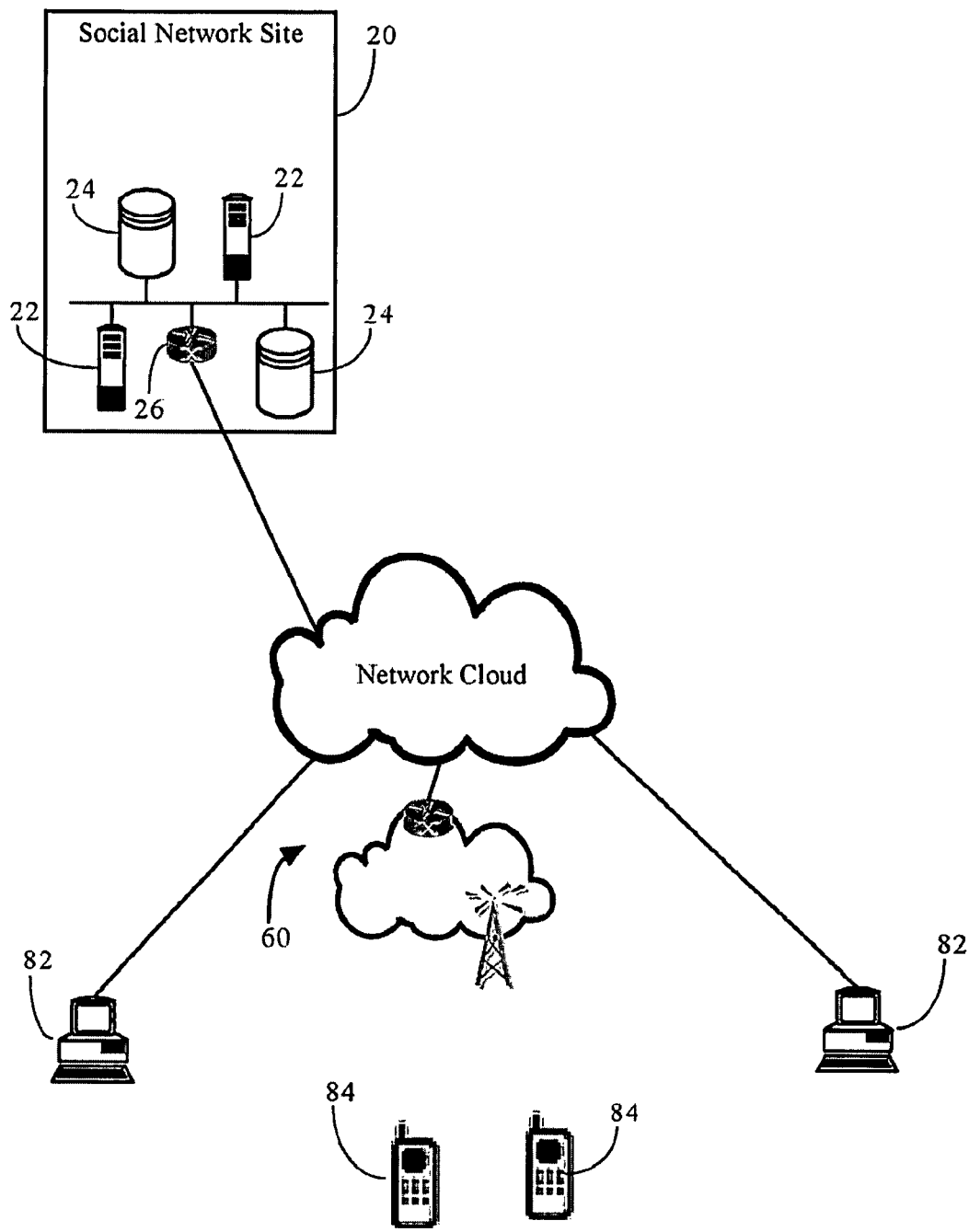
FIG. 1 illustrates an example network environment in which particular implementations may operate.

FIG. 1 illustrates an example network environment in which particular implementations may operate. Particular implementations of the invention operate in a wide area network environment, such as the Internet. As FIG. 1 illustrates, a particular implementations of the invention may operate in a network environment comprising a social network site 20 that is operatively coupled to a network cloud 60. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Client nodes 82 and 84 are operably connected to the network environment via a network service provider or any other suitable means. Client nodes 82 and 84 may include personal computers or cell phones, as well as other types of mobile devices such as laptop computers, personal digital assistants (PDAs), etc.

Social network site 20 is a network addressable system that hosts a social network application accessible to one or more users over a computer network. The social network application may include web site and server functionality where users may request and receive identified web pages and other content over the computer network. The social network application may also allow users to configure and maintain personal web pages.

In particular implementations, social network site 20 comprises one or more physical servers 22 and one or more data stores 24. The one or more physical servers 22 are operably connected to computer network 60 via a router 26. The one or more physical servers 22 host functionality that allows users to interact with the social network, such as uploading and retrieving content from client nodes 82 and 84. In one implementation, the functionality hosted by the one or more physical servers may include web or HTTP servers, FTP servers, and the like.

Physical servers 22 also host functionality directed to a social network site 20 described herein. In one implementation, a data store 24 may store user account information, including core information such as user identifiers, passwords, names, etc., as well as other user related information such as user profile data, addresses, preferences, financial account information, pointers to uploaded content and pointers to one or more modules for processing content, etc. A given data store 24 may also store content such as digital content data objects and other media assets. A content data object or a content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

A.2. Example Server System Architecture

The server host systems described herein may be implemented in a wide array of computing systems and architectures. The following describes example computing architectures for didactic, rather than limiting, purposes.

Figure 2:
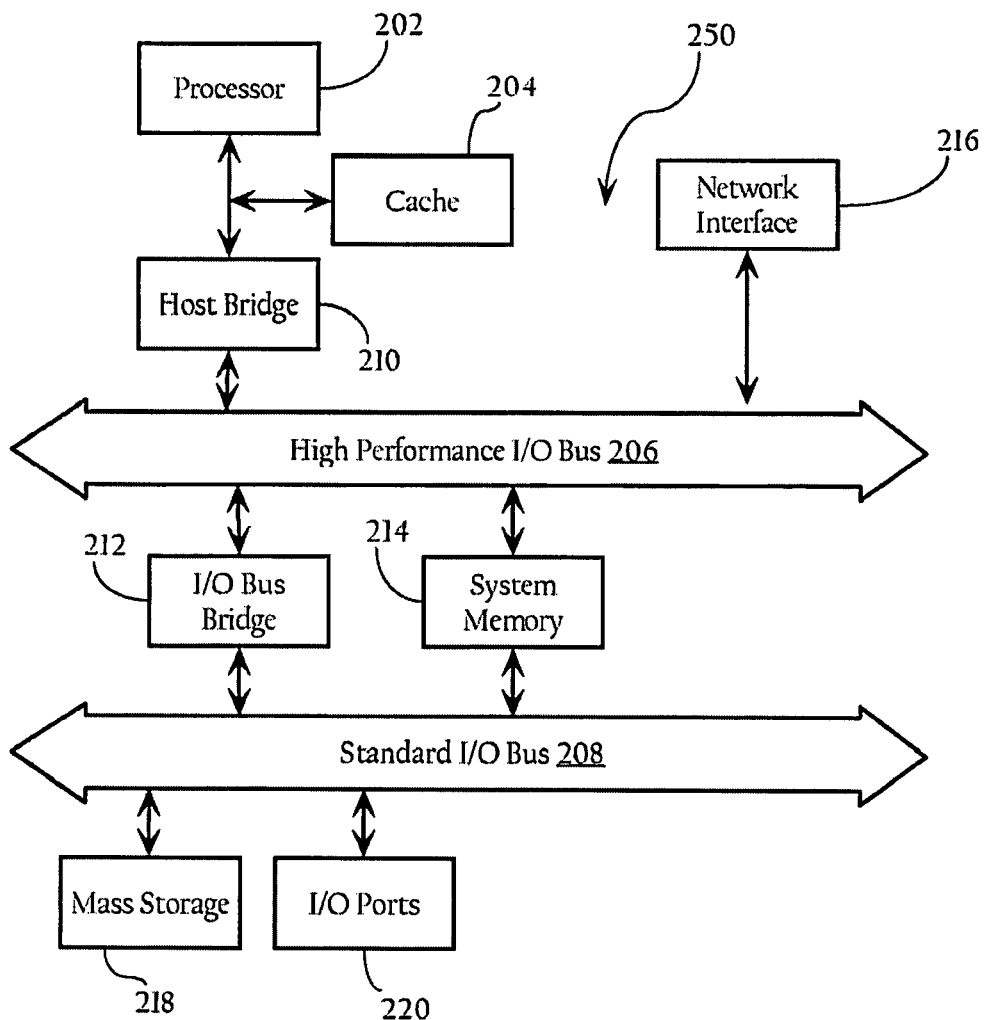
FIG. 2 illustrates an example computing system architecture, which may be used to implement a physical server.

FIG. 2 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

A.3. Example Social Network Site Functionality

Figure 3:
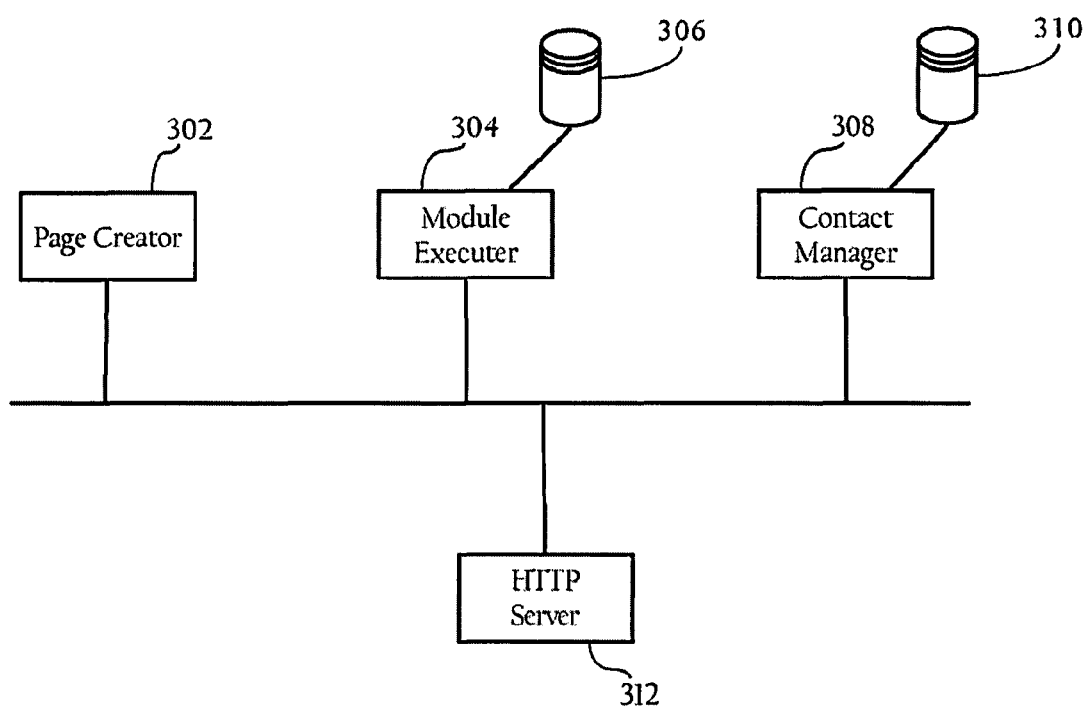
FIG. 3 illustrates example social network site components which may be used to implement particular functionalities described herein.

FIG. 3 illustrates example functional components of a social network site which may be used to implement particular functionalities described herein. The social network site 20 components include a page creator 302, a module executer 304 operatively coupled to a data store 306, a contact manager 308 operatively coupled to a data store 310, and a Hypertext Transfer Protocol (HTTP) server.

As described in more detail below, page creator 302 generates personal pages for users based on layout information (e.g., user profile information, etc.) and a base template. Layout information is described in more detail below in connection with FIG. 4. The module executer 304 is configured to access modules (e.g., from data store 306) and execute one or more modules in order to obtain module information from local resources such as data store 306, from separate platforms such as contact manager 308, or from one or more remote resource. Contacts manager 308 manages the relationships for the users of the social network site 20, and may perform contact related functions such as accessing friend lists, contact lists, and/or presence information from data store 310 or from other external data sources.

In particular implementations, each module is a functional software program (e.g., code, code objects, application, etc.) that the module executer 304 may invoke to obtain module information. For example, module executer 304 may execute a contacts module that communicates with contact manager 308 to fetch contact information for a given user. Such contact information may include, for example, who is viewing the personal page of the user or who is currently on-line. As described in more detail below, module executer 304 may execute other modules such as media player modules, revision history modules, blurt modules, video game modules, photo modules, conversation modules, etc.

Although FIG. 3 illustrates the foregoing components as separate systems, the functionality represented by each component may be combined into other systems. Furthermore, the functionality represented by each depicted component may be further separated. Still further, implementations of the invention may operate in network environments that include multiples of one or more of the individual systems and sites disclosed herein. In addition, other implementations may operate in network environments where one or more of the system described herein have been omitted.

B. Managing Access to the Social Network Site

In one implementation, a user may access the social network site 20 and establish a user account. To establish an account, the user provides a set of core information, which, in one implementation, may include profile data such as user identification (ID), a password, name, gender, age, a location, etc. In particular implementations, the name may include a first name, a last name, alias name, etc. As described in more detail below, once an account is established, some of the core information (e.g., name, gender, age, location, etc.) may be displayed to the public on the personal page of the user. In particular implementations, the core information may be stored in a data store 24 or in any other suitable user account database(s). After an initial authentication, the user may be granted subsequent accesses automatically using cookie-based mechanisms. For example, after a user has been authenticated, social network site 20 may create or update an encrypted cookie and provide it to the client application, such as a browser, that the user is using to access the social network site 20. The cookie is automatically appended to subsequent requests, which the social network site can decrypt and authenticate to validate subsequent accesses.

In one implementation, the social network site 20 may authenticate a given user by requiring the user to provide user-unique information such as a user ID and password, which maps to the user account. In particular implementations, the user ID may be authenticated using various types of authentication mechanisms (e.g., Yahoo ID and password, Open ID, Microsoft Passport, etc.). The social network ID may be any data string such as an email address (e.g., a Yahoo! email address), an existing or new user ID (e.g., Yahoo ID (YID)), open ID (e.g., a Uniform Resource Locator (URL)), etc.

In one implementation, the social network site 20 may utilize one level of identity (e.g., user ID and password) for purposes of authentication. In particular implementations, the social network site 20 may allow other users to create stub-accounts for new users and invite them to join. In one implementation, a stub-account may be a temporary account that a new user may convert into a regular user account if the new user accepts the invitation to join. For example, in one implementation, the social network site 20 may set up stub-accounts for new users, where a given user may be identified by an email address until the user logs in and claims the stub-account. In one implementation, the original social network ID (e.g., email address) may be subsequently replaced with a newly created social network ID (e.g., a Mosh ID (MUID)). As such, the user may access the social network using the new social network ID. In particular implementations, each previous social network ID of the user may become an alias ID for the current social network ID. In other words, the profile data of the user may be associated with an email or any other suitable data string. As such, the owner of the personal page as well as trusted users may still access the personal page of the owner using the alias ID. Also, other users may locate the owner or send the owner messages or invitations using the alias ID (e.g., email address).

C. Example Personal Page

As introduced above, social network site 20 provides personal pages for users and applies wiki-based technology to enable other users to modify the personal page of a given user. As described above, wiki functionality, generally, enables a given webpage to be collaboratively modified and edited by multiple users. In particular implementations, the only users other than the owner of the personal page that may modify the personal page of the owner are trusted users. In a particular implementation, the owner of the personal page approves the trusted users. In another implementation, the owner of the personal page may define one or more rules that automatically define a trusted user.

C.1. Elements of the Personal Page

Figure 4:
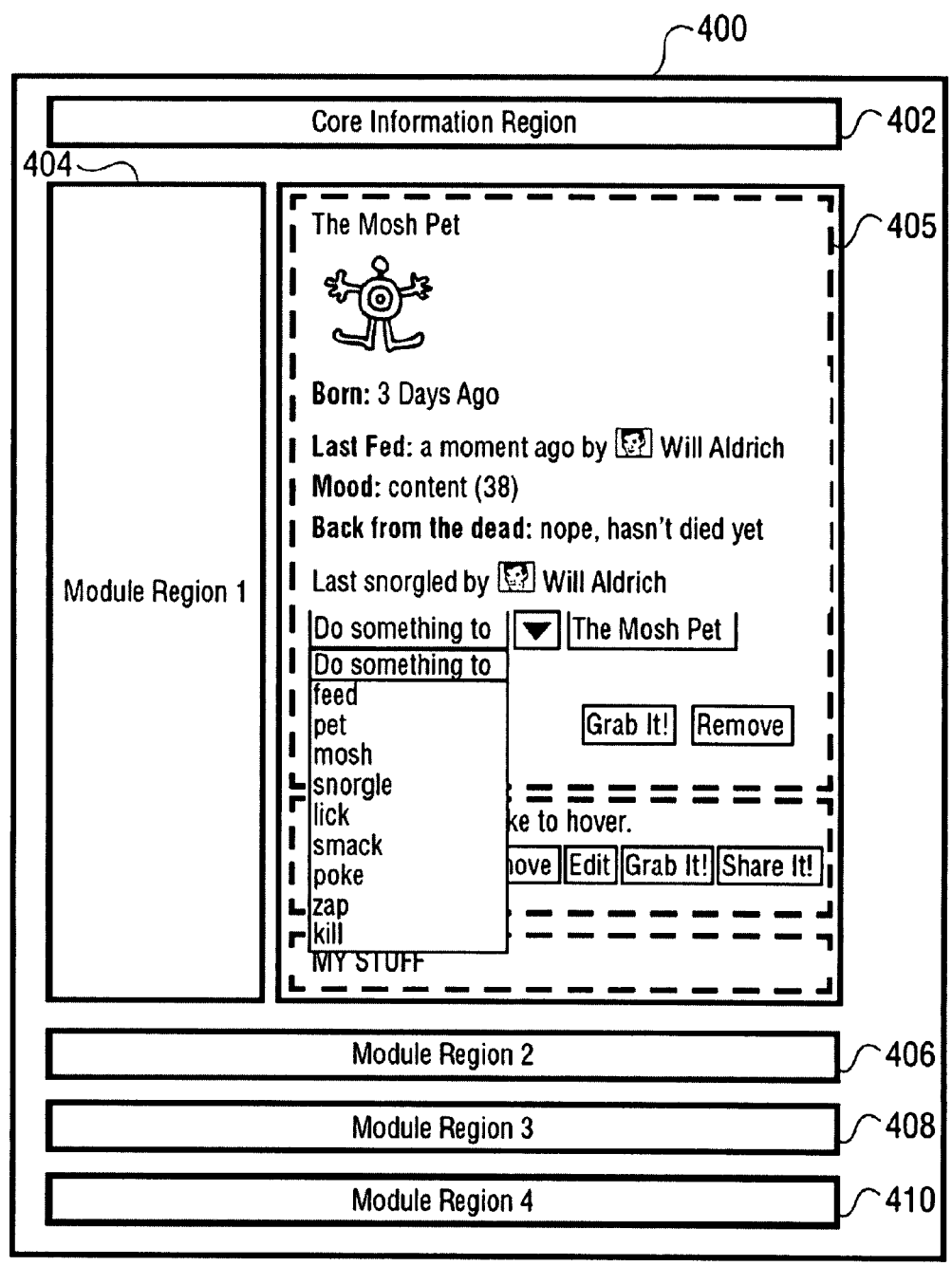
FIG. 4 illustrates an example personal page.

FIG. 4 illustrates the components of an example personal page. As FIG. 4 illustrates, a personal page 400 includes a core information region 402 and one or more module regions 404, 405, 406, 408, and 410. As indicated above, the core information region 402 displays core information, which, in one implementation, may include profile data such as user identification (ID), a password, name, gender, age, a location, etc. In one implementation, the displayed module regions 404-410 can be generated by module executor 304. For example, module executor 304 may be passed a command identifying a user ID, and a module identifier (such as a core information module). The module executor 304 may then invoke module code or retrieve a script and construct the information to be displayed as a set of HTML code. The generated HTML code may then be returned to page creator 302 for incorporation in the HTML page returned to the requesting user.

Each module region 404-410 may display information unique and/or specific to the module type. For example, one module region 404 may display a blurt, which is a statement (e.g., word or phrase of the day) that the owner may write. In particular implementations, trusted users may edit the owner's blurt, and the owner may approve or reject the edit. In one implementation, the blurt module may display a blurt trail showing the different blurts associated with a given owner. In one implementation, the blurt module may display a blurt aggregation page showing the blurts of all contacts. Another module region 405 may display a pet module region showings an interactive digital pet. When invoked, a pet module renders an object that is a representation of an animated object (e.g., a pet) in a pet module region. As described in more detail below in connection with FIGS. 17-19, the pet module facilitates social interaction among users by providing a structured mechanism by which users can interact by allowing users to select an action from an action menu to be applied to the digital pet.

Another module region 406 may display a media player for playing a selected media file or media file play list including music, videos, etc. Another module region 408 may display a revision history log. Another module region 410 many display a slideshow of digital photographs uploaded by the page owner. As described in more detail below, the module regions 404-410 display information based on modules. In particular implementations, a module may be code sections, code objects, applications, scripts, etc. that include computer-readable instructions operable to cause a processor to perform a set of actions. Using a player module as an example, the player module may cause a processor to fetch and play music from a local or internal source. The player module may provide user controls on a player displayed in the player module region (e.g., module region 404).

C.2. Generating and Modifying a Personal Page

As described in more detail below, the owner and trusted users may modify the personal page of the owner by adding or removing modules, moving module locations, and/or by modifying information in regions of existing modules. The social network site 20 performs the changes by updating one or more data structures, such as table entries that describe various attributes of the module information associated with the owner of the personal page. For example, in particular implementations, the social network site 20 may utilize a data table that stores user associated data (e.g., user profile data), a key table for looking up information in the data table based on keys, and a permission table for storing permissions.

C.2.a. Data Table

FIG. 5 illustrates an example data table. As FIG. 5 shows, the data table includes multiple table entries, each including information directed to one or more attributes of a personal page or a module associated with a personal page. In one implementation, the first column shows owner fields. For ease of illustration, the data table shown in FIG. 5 shows a single owner. As such, the data in the same row of the indicated owner is associated with the personal page of that owner. The data table may include other entries associated with the owners of other personal pages. Alternatively, in particular implementations, a unique data table may be partitioned from each owner.

In one implementation, the data table may include editor fields, which show which user has modified or attempted to modify the personal page of the owner (i.e., the other fields of that row). As FIG. 5 shows the editor may be the owner or other users. As described above, in one implementation, the only users, other than the owner who may modify the personal page of the owner, are trusted users that have been approved or otherwise configured by the owner (e.g., friends, family, etc.).

As FIG. 5 shows, the data table also includes key fields that store keys, which are strings corresponding to some information item. The value fields store values of information associated with particular keys. The time stamp fields indicate the time a given entry was added. The status fields indicate whether or not the owner has approved or rejected a given change, or whether the entry is obsolete. The difference fields store other information such as metadata or edits that may be associated with a given module. A given data field may also be null or empty for some module fields, depending on the specific module to which the entry corresponds.

In particular implementations, modifications made by users to a given personal page may result in one or more entries in the data table and/or key table. For example, referring to the first or top row, an owner "S" is the user who owns the personal page being changed, and editor "R" is the user making the changes to that personal page. The key that was changed (or added) is "Candy", and the value of "Candy A" associated with that key at time "1." As a subsequent time, referring to the second row from the top, editor "W" changed the value associated with the same key "Candy" to "Candy B" at time "2." As shown in the status field, owner "S" has approved the change. As such, the status field indicates "Approved." In one implementation, once the owner has approved a given change, any previous entries become obsolete, as indicated in the status field of the first row. In one implementation, before a given change is approved or rejected, the status field indicates "Pending."

If the owner rejects a give change, the status field will indicate "Rejected." In one implementation, if a given change is rejected, the associated module region will show the previously approved value or no value if none has been approved. In one implementation, if a given entered value is deemed inappropriate either by the user or by policy, the change will not be initiated and the status field will indicate "Rejected."

FIG. 5 shows other example keys such as a pet key, photo key, and layout key. As described in more detail below, the data table may be utilized to add or remove modules from a personal page. This is achieved by adding a new entry to the data table. In one implementation, the value field associated with the key "Layout" stores data indicating which specific modules are to be displayed on a personal page, where the module regions are to be positioned in the personal page, and where other associated information is to be positioned within the module region.

C.2.b. Key Table

FIG. 6 illustrates an example key table for a given user. As FIG. 6 shows, the data table includes owner fields, key fields, label fields, and module fields. In one implementation, the label fields indicate the label that will be displayed (e.g., "Candy"), and the module fields indicate the module IDs of the modules associated with the key. In particular implementations, the fields of the key table are customizable fields. As such, key tables for different users have different fields, depending on the modules associated with the keys.

C.2.c. Permission Table

FIG. 7 illustrates an example permission table for a given user. As FIG. 7 shows, the data table includes owner fields, action fields, and setting fields. In one implementation, a given owner field may identify the ID of the user whose profile the settings are for. In one implementation, a given action field may specify the type of operations users can perform on the page and may specify one or more potential target actions (e.g., "edit module A," "view module B," etc.). In one implementation, a given setting field may contain a value that represents a class of users who can perform the action(s). In particular implementations, values for settings may include "friends," "only me," "anyone," or categories of friends such as "friends" or "family."

The following process flows describe various implementations involving the data table, key table, and permission table, and describe how the social network site utilizes information in these tables to enable users (e.g., a given owner and trusted users) to create and modify a personal page.

In one implementation, the owner of a page can add someone as a friend, which confers editing permission on that person for the owner's personal page under the default settings of one implementation of the system. The friend can then return and edit the owner's personal page. After the friend has edited the owner's personal page, the owner can reject or approve the change. If approved, the change stays present. If rejected, the change is removed from the owner's profile. The primary affordance for approving or rejecting changes is a revision history page for the owner's profile, which is described in more detail below in Section D (Revision History Module). In a given implementation, permission can be toggled on or off for any given friend. In particular implementations, only friends can have permission to edit any owner's page. That is, anonymous, non-friend users cannot edit an owner's page.

C.3. Creating a Personal Page

Figure 8:
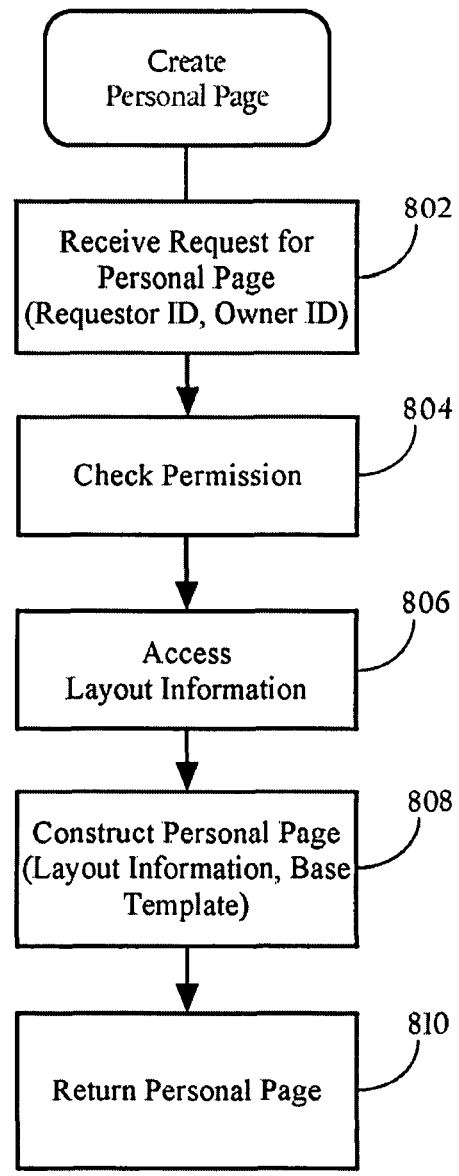
FIG. 8 illustrates an example process flow associated with creating a personal page.

FIG. 8 illustrates an example process flow associated with constructing a personal page in response to a user request. As FIG. 8 shows, the page creator 302 receives a request for a personal page (802). In one implementation, the request may include an owner ID corresponding to the owner of the personal page, and a requestor ID. In one implementation, the requestor ID may be the social network ID of the user requesting the personal page. In one implementation, the requestor may be the owner of the personal page. In particular implementations, the requestor may be a user who is creating the personal page for another user. The page creator 302 then checks the permission associated with the request (804). In one implementation, if the requesting user does not have viewing permissions, a generic layout may be used in step 808 below.

The page creator 302 then accesses layout information (806). The layout information is an encoded string that encodes layout information associated with the personal page. The layout information may include one or more module identifiers and region identifiers encoded using JavaScript Object Notation. In one implementation, the layout information is defined relative to a base template. For example, the base template may include several pre-defined regions, such as quadrants and upper and lower regions. The layout information may define which modules are to be displayed in which base template region.

To access layout information, page creator 302 searches the key table for the layout entries corresponding to the owner of the personal page. As discussed above, as modifications are made, additional table entries are added. In one implementation, the page creator 302 identified all matching table entries including the layout key and finds the latest entry that has not been rejected by the personal page owner. In a particular implementation, as page creator 302 and module executor 304 retrieve data from the data table it stores the entries in a cache to facilitate fast access for subsequent requests. For example, for a given owner, the page creator 302 can obtain all of the associated keys, labels, and modules from the key table. Based on the keys, the page creator 302 can obtain all of the values and other pertinent information from the data table. The page creator 302 then performs calculations such as sorting the data entries by key, identifying latest versions, etc. The page creator 302 then segregates data entries by module, referring to key table, and then caches the module relations, values, etc.

The page creator 302 then constructs the personal page based on the layout information and a base template (808). To perform this step, in one implementation, the page creator 302 causes the module executer 304 to execute one or more modules identified in the encoded layout information associated with each module. In particular implementations, execution of different types of modules results in the generation of HTML, scripts, and/or other code sections for inclusion in the page returned to the requesting user. For example, one module may return user contacts information. Another module may fetch conversation threads. Another module may fetch player information, etc. In particular implementations, the information may be retrieved from local sources (e.g., from local databases 306, 310, etc.) or from external sources (e.g., a web service). A contacts module may fetch user profile data such as contacts, etc., via the contact manager. After the modules generate resulting code sections, they pass the code sections to the page creator 302. After the page creator 302 receives the information, the page creator 302 merges the code section information with a base template. The page creator 302 then returns the personal page to the client of the owner via HTTP server 312 (810).

C.4. Modifying a Personal Page

FIG. 9A illustrates an example process flow associated with modifying a personal page using Asynchronous JavaScript and XML (Ajax) technology. Ajax is a web development technique used for creating interactive web applications. Ajax enables web pages to feel more responsive to users by exchanging small amounts of data with a server that performs database transactions behind the scenes. As such, the entire web page need not be reloaded or re-rendered each time the user requests a change. Overall, this increases the interactivity, speed, functionality, and usability of a web page.

In particular implementations, modules and personal page functionality have client-side scripts, such as Ajax scripts, that allow the modules to be modified on the client side. Ajax enables a user to quickly modify content in a given module region. When a user changes one or more attributes of the personal page, an Ajax script transmits data characterizing the change to social network site 20. When a given change is finalized, Ajax receives a status and implements code to carry out the change, which may include adding HyperText Markup Language (HTML) code to the module region and rerendering the relevant portions of the module region. In addition, the modification also results in a new data table and/or key table entry.

As FIG. 9A shows, the HTTP server 312 receives a modification request (902) resulting from execution of an Ajax script embedded in the personal page. In one implementation, the modification request includes an editor ID, owner ID, module ID, module specific parameters characterizing the modification, etc. The page creator 302, responsive to the request, causes the module executer 304 to invoke the appropriate module or code (904). In one implementation, if the requestor is not the owner of the personal page, the module executer 304 performs a permission check, referring to the permission table. For example, the module executer 304 may determine whether the requestor is a trusted user. In particular implementations, different modules require different permission checks. Permission checks are described in more detail below in connection with FIG. 11. If the requestor has the permission to make the change, the module executer 304 performs the requested change (e.g., add or remove a module, edit information in an existing module region, etc.). In a particular implementation, the module executor 304 also adds a new data table and/or key table entry for the modification. As discussed above, each entry includes the owner of the page, the editor, a key, a value, a time stamp, and optionally other information. The page creator 302 returns a status message to the client (906). On the client side, Ajax code carries out the modification in the appropriate module region of the personal page in response to receiving the status code. In one implementation, the page creator 302 sends an HTML code snippet to the client, and the Ajax code appends the HTML code to an existing element on the personal page, or replaces the HTML code of the existing element.

FIG. 9B illustrates an example process flow associated with modifying a personal page without using Ajax. The HTTP server 312 receives an HTTP request requesting the modification (901) Steps 902 and 904 of FIG. 9B are similar to steps 902 and 904 of FIG. 9A, where the HTTP server then receives a modification request (902), and the module executer 304 invokes the appropriate module or code (904). The HTTP server then redirects the browser back to the personal page, which is re-rendered with the new information (907).

C.5. Setting Permissions

In one implementation, the owner of a given personal page may determine what aspects of the personal page may be viewed or edited, and by whom. In one implementation, only the owner may modify core profile information. FIG. 10 illustrates an example page for setting permissions of a user profile. As FIG. 10 shows, the owner can select who can view or edit the profile, or who can participate in conversations (e.g., friends, family, anyone, etc.). FIG. 10 is merely an example and does not limit what permissions the owner may set.

FIG. 11 illustrates a process flow associated with determining permission to modify a page. The module executer 304 obtains permission information associated with the owner (e.g., a permission setting for the action) (1102). The module executer 304 then obtains the relationship of the owner and editor (1104). In one implementation, the module executer 304 may obtain the relations from the contact manager 308. The module executer 304 determines if the relationship matches the permission (1106). For example, the relationship matches the permission if the editor is the owner, or, if the owner has granted permission to the editor. If there is not a match, the module executer 304 denies the request (1108).

If there is not a match, the module executer 304 determines if the permission for the action has been revoked. In particular implementations, the owner may blacklist other individual users. For example, Alice has friends Bob and Eve. Alice has set her profile's edit permissions to "friends." Now Bob and Eve can modify Alice's profile, but it turns out Eve likes to put malicious content on Alice's page. Alice can revoke edit permissions from Eve. Alice then adds Charlie as a friend. Charlie and Bob can modify Alice's profile (because they are "friends") but Eve cannot (because she was blacklisted). In one implementation, Eve's permission setting may be stored in the contacts manager. If the permission for the action has been revoked, the module executer 304 denies the request (1108). Otherwise, if the permission for the action has not been revoked, the module executer 304 performs the appropriate database transaction (1112).

D. Revision History Module

In one implementation, the social network site 20 provides users with a revision history module that tracks the activity of users that view or edit the personal page of a given owner. FIG. 12 illustrates an example page showing a revision history for a particular user. As FIG. 12 shows, the page shows a series of edits to the user's personal page in reverse chronological order from top to bottom. Each line item indicates which module has been added or removed or what aspects of an existing module region have been changed. Each line item also indicates if the owner has approved or rejected a given change, or provides a selection for the owner. For example, referring to line items 5-8 and 10 from the top, the owner has approved those changes. Referring to the second line item from the bottom of the page, another user has written a guestbook entry. The far light shows a "[Reject] [Approve]" selection, which the owner may select. In one implementation, the page may also provide links to show details of the modifications. FIG. 13 illustrates an example page showing details of changes made by particular users. For example, the first set of edits were made by another user, and the second set of edits were made by the owner.

In one implementation, the "Approve" option may be omitted, where edits are implicitly approved and rejecting edits removes the edit. In particular implementations, the revision history module may provide a "Reject as Spam" action to differentiate abusive or malicious edits from simply unwanted edits.

FIG. 14 illustrates a process flow associated with displaying a revision history. As FIG. 14 shows, the module executer 304 executes a revisions history module to obtain all edits from the data table for contacts to which the owner has access (1402). In one implementation, the revision history module performs a permission check during this step. In one implementation, the revision history module may shows only content for contacts profiles to which the user has access (e.g., visibility permissions). The revisions history module then iterates over the data (1404). Specifically, in one implementation, the module executer 304 identifies the relevant keys in all entries associated with the owner and invokes a key value renderer to return a description of the edits. In one implementation, some edits such as rejected edits may be filtered out. The revisions history module then aggregates the data (1406). In one implementation, the module executer 304 sorts the data by time stamp during the aggregation. The module executer 304 then displays the data in reverse chronological order.

In one implementation, the revisions history module determines the last editor for a particular module of a profile. In one implementation, the revisions history module may determine the last editor of the entire personal page. In one implementation, the module executer 304 may determine the most prolific editor.

In one implementation, the revision history module may perform a pulse function, where the revision history module performs a revision history on a global basis (e.g., the edits of all of a given owner's contacts). FIG. 15 illustrates an example page showing updates from all of the contacts of a given user. As FIG. 15 shows, for all contacts, edits are made to the personal pages of other users.

FIG. 16 illustrates a process flow associated with displaying a revision history. As FIG. 16 shows, the revision history module obtains all contacts of a given user (1400) and then obtains all of the edits made by the contacts to other users (1401). The revision history module then obtains all edits from the data table for contacts to which the owner has access (1402). In one implementation, the revision history module performs a permission check during this step. In one implementation, the revision history module may shows only content for contacts profiles to which the user has access (e.g., visibility permissions). The revision history module then iterates over the data (1404). In one implementation, the module executer 304 identifies the relevant keys in all entries associated with the owner and invokes a key value renderer to return a description of the edits. In one implementation, some edits such as rejected edits may be filtered out. The revision history module then aggregates the data (1406). In one implementation, the module executer 304 sorts the data by time stamp during the aggregation. The module executer then displays the data in reverse chronological order.

E. Interactive Digital Pet Object

In one implementation, the social network site 20 provides an interactive digital pet. In a particular implementation, the interactive digital pet is provided as a module that a user can add to his or her personal page. When invoked, the pet module renders an object that is a representation of an animated object (e.g., a pet) in a pet module region. In particular implementations, the pet module facilitates social interaction among users by providing a structured mechanism by which users can interact by allowing users to select an action from an action menu to be applied to the digital pet, as described below.

Figure 17:
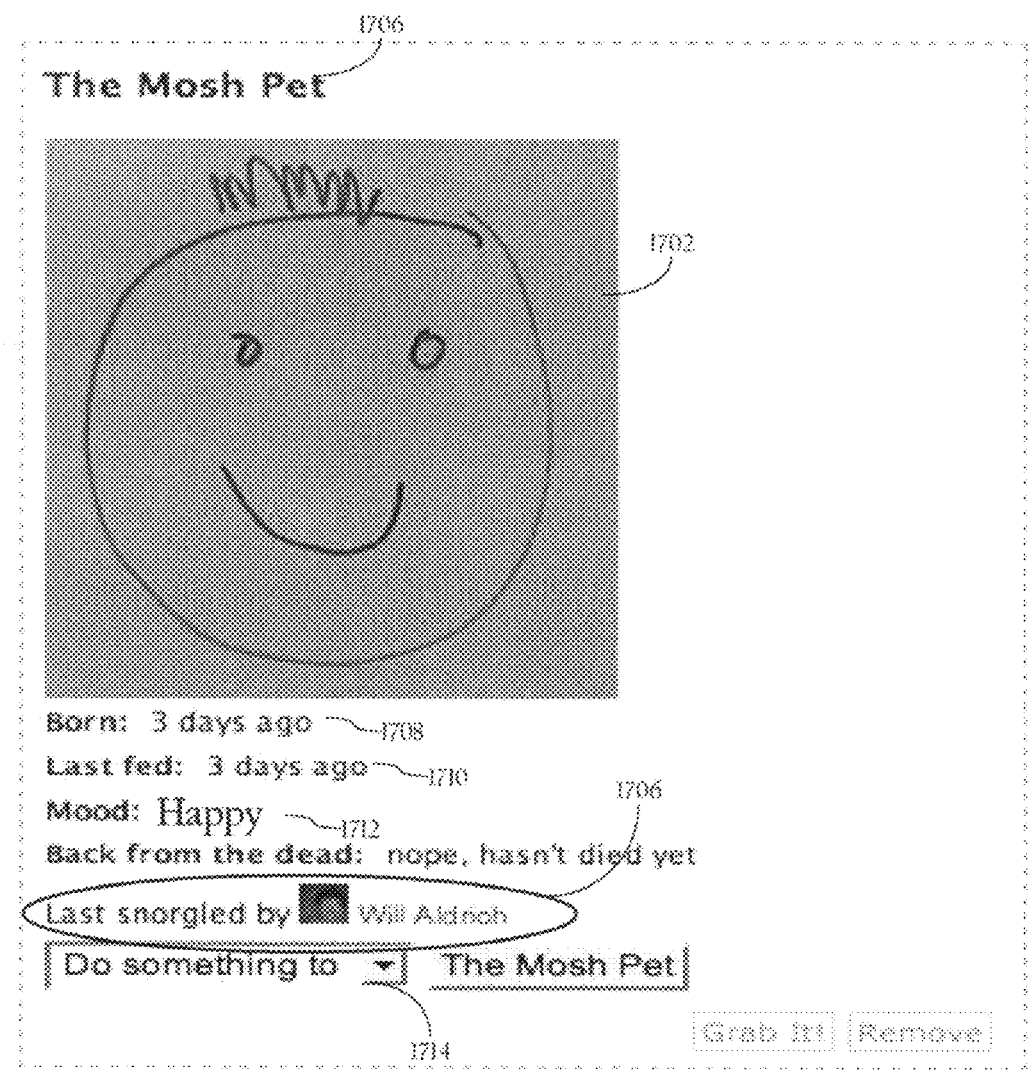
FIG. 17 illustrates a user interface including an example interactive digital pet object.

FIG. 17 illustrates a user interface including an example interactive digital pet object. As FIG. 17 shows, the pet module region 405 displays a representation of an interactive digital pet object 1702, pet attribute information, and one or more action controls 1704. In the implementation shown, the pet attribute information may include a pet name, creation or birth date, a current state or mood, a history of one or more actions taken and by whom, etc. For example, FIG. 17 shows an interactive digital pet object 1702 with the name "The Mosh Pet" 1706, when the interactive digital pet object 1702 was created (born) "3 days ago" 1708, when the interactive digital pet object 1702 was last fed 1710. The pet attribute information further includes the current state (here, "happy") 1712, and the identity of the last action applied to the interactive digital pet object 1702 and the user who applied that last action 1714. As FIG. 17 illustrates, the module region 405, in a particular implementation, provides a thumbnail image or avatar associated with the user, and a user identifier encoded as a hypertext link that, when clicked, resolves to the user's personal page. While FIG. 17 shows one possible representation or image of a pet, other representations are possible. For example, a user may create and apply customized pets by creating one to a plurality of images and associating the images, during an upload process, with a state or range of states.

In one implementation, the module region also indicates the current state or "mood" of the interactive digital pet object 1702. While the mood shown in FIG. 17 indicates "happy", the mood may indicate "hungry," "sad," "lonely," "excited," "tickled," etc. In one implementation, the representation of the interactive digital pet object 1702 changes depending on the mood. For example, if the mood of the interactive digital pet object 1702 is happy, the interactive digital pet object 1702 may have a smile. If the mood of the interactive digital pet object 1702 is sad, the interactive digital pet object 1702 may have a frown. As described below, the actual mood of the interactive digital pet object 1702 may correspond to the aggregate of actions taken by other users. In particular implementations, the social network site 20 maintains different images for different corresponding states or moods in a data store. When constructing the page, a module executor 304 may access the data tables discussed above to obtain the latest entry for the interactive digital pet object 1702 of the user associated with the personal page and add to the HTML code that implements the pet module region a uniform resource locator (URL) for the image that corresponds to the state of the interactive digital pet object 1702. In another implementation, the image may be directly embedded into the page.

Figure 18:
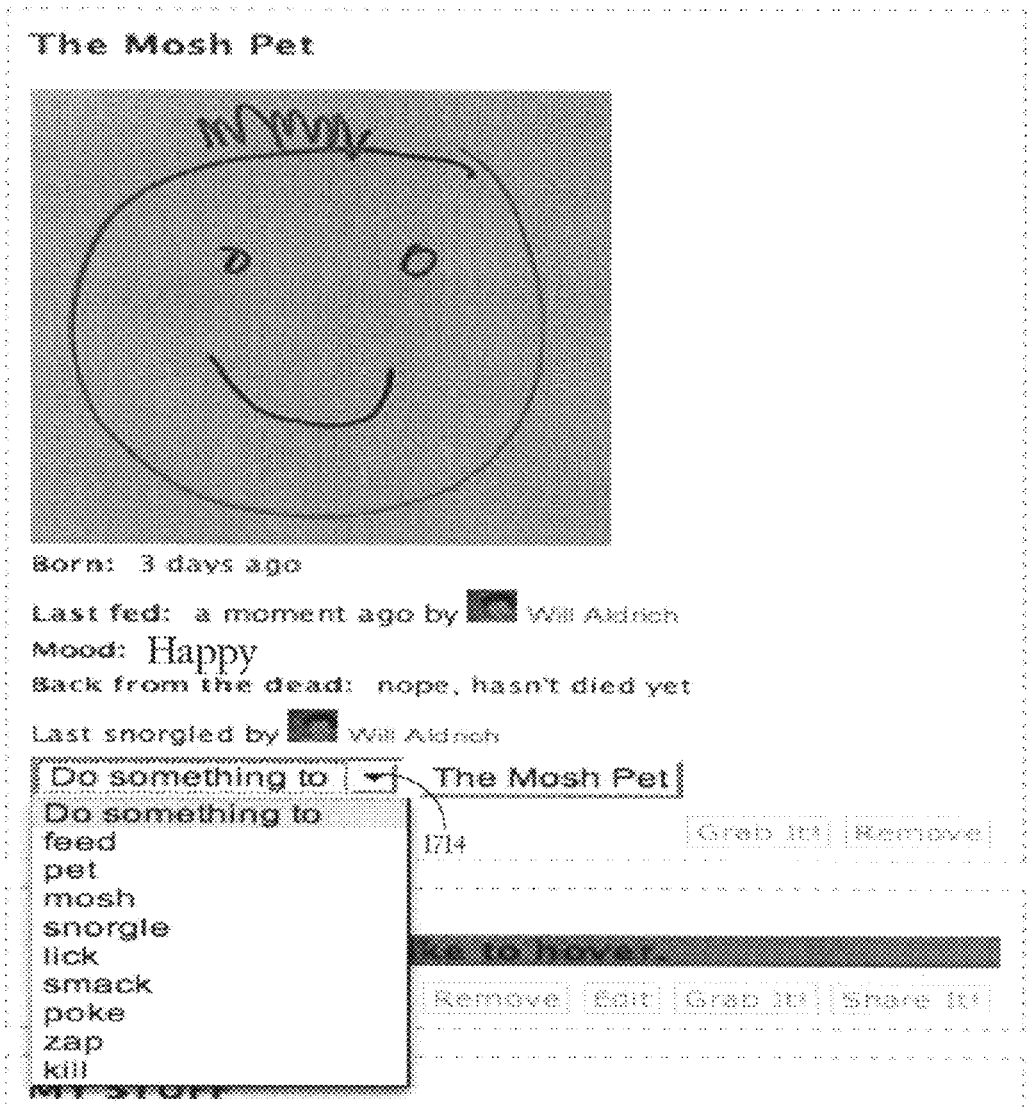
FIG. 18 illustrates a user interface including showing an example interactive pet object and an action selector control.

FIG. 18 illustrates a user interface including showing an example interactive pet object 1702 and possible actions available under an action selector control. As FIG. 18 shows, the action selector control 1714 may be a pull-down menu showing various action selections. For example, such selections may include feed, pet, mosh, snorgle, lick, smack, poke, zap, kill, etc. In one implementation, any action taken may effect the status or mood of the interactive digital pet object 1702. As indicated, the action selected by a given user will affect the mood of the interactive digital pet object 1702. For example, if someone pokes the interactive digital pet object 1702, the mood might be angry. If someone feeds the interactive digital pet object 1702, the mood might be happy. As such, if the mood changes (e.g., happy), the image of the interactive digital pet object 1702 will indicate the mood (e.g., a smile). In one implementation, the state of the interactive digital pet object 1702 may be determined based on an aggregation of actions applied to it. In a particular implementation, the state information may be based on the history of actions stored in the data tables discussed herein.

As discussed above, the pet module tracks who has taken an action upon the interactive digital pet object 1702, when the action was taken, and what the action was. As FIG. 18 shows, in one implementation, the pet module may display the last action taken and by what user in the module region. In one implementation, the pet module may display a link to the personal page of the user who last interacted with the interactive digital pet object 1702. In another implementation, the pet module may display a history of the last N actions applied to the interactive digital pet object 1702, or may optionally display links to the personal pages of all of the users who interacted with the interactive digital pet object 1702 and their respective actions. Displaying this information allows the owner to view the actions and to decide whether to contact one or more of the users identified in the action history. For example, the page owner may reciprocate and interact with the interactive digital pet object 1702 of the user who took the last action or other users who took actions. In this manner, the interactive digital pet object 1702 and history data facilitates or promotes interaction between users by providing a structured mechanism for interaction that is simple and fun.

Figure 19:
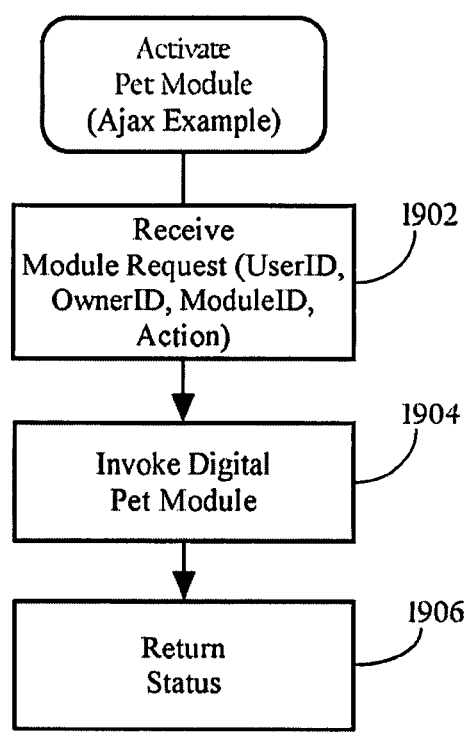
FIG. 19 illustrates a process flow associated with invoking a pet module.

FIG. 19 illustrates a process flow associated with invoking a pet module using an Ajax script implemented within the context of a browser client. As described above, Ajax is a web development technique used for creating interactive web applications. An Ajax script can be configured to cause a browser client to interact with a remote server to obtain additional information that can be added to the page without having the entire page re-rendered or refreshed. As FIG. 19 shows, in response to user interaction with the interactive digital pet object 1702 by selecting an action using action selector control 1714 (e.g., feed), social network site 20 receives a module request generated by a script (e.g., Javascript) executing within the context of the page (1902). In one implementation, the module request includes an editor ID, owner ID, module ID, module specific parameters (such as the current state of the interactive digital pet object 1702 and the action selected by the user). Social network site 20, responsive to the module request, causes the module executer 304 to invoke a digital pet module (1904). In one implementation, when the digital pet module is invoked, it accesses the data tables discussed above, using the module ID and owner ID as a key, to obtain state information such as current mood, last action taken and by whom, time stamp, customized image if applicable, and optionally other information. FIG. 5 illustrates two entries for a pet object where users (labeled R and W, for didactic purposes) have applied actions to a pet of a page owner, S. The value string includes the action taken by the user, and the resulting state of the interactive digital object. In one implementation, the pet module updates the data table in the database by adding a new entry including the owner ID, editor ID, module ID, action taken, a time stamp, and the new current state.

The module executor 304 may compute a new state for the interactive digital pet object 1702 by accessing the current state of the most recent entry in the data tables, and computing a new state based on the action received in the module request. For example, if the user fed the interactive digital pet object 1702, the current mood may be changed (e.g., to a happy mood, etc.). After a new state is computed, social network site 30 returns a status message to the client identifying the new state and possibly other information that is used to modify the information rendered in the pet module region (1906). On the client side, Ajax script carries out the modification in the pet module region 405 of the personal page in response to receiving the status code. If the new state requires a new image, social network site 20 may also return a URL to the image corresponding to the new state. The Ajax script may insert the new URL into the HTML code of the module causing the new image to be fetched and rendered. In other implementations, Javascript can be used to transmit the module request, and social network site 20 can transmit a redirection or HTTP refresh message that causes the browser client to refresh the rendered page by transmitting an HTTP request for the viewed page. In another implementation, clicking on the action selector control 1714 causes the browser client to transmit an HTTP request for a new page.

As discussed above, the pet module implemented by module executor 304 may compute a new state for the interactive digital pet object 1702 by accessing the current state of the most recent entry in the data tables, and computing a new state based on the action received in the module request. In other implementations, the pet module implemented by module executor 304 may apply a stateful algorithm that determines a new state based on the last N actions applied to the interactive digital pet object 1702. Additionally, in one implementation, the pet module processes the actions applied the interactive digital pet object 1702 to determine a likeability factor (e.g., whether the interactive digital pet object 1702 likes or dislikes a particular user and to what degree). For example, if a user A often feeds and pets the interactive digital pet object 1702, the pet module may determine from the history of actions associated with user A that the interactive digital pet object 1702 likes the user A. In contrast, if a user B often pokes and zaps the interactive digital pet object 1702, the pet module may determine from the history of user B that the interactive digital pet object 1702 dislikes user B. In one implementation, the pet module may consider the number of times a given user has taken a particular action. For example, if the interactive digital pet object 1702 likes user A as a result of user A often feeding the interactive digital pet object 1702, the interactive digital pet object 1702 would not necessarily dislike user A if user A poked the interactive digital pet object 1702 once. However, if user A began poking and zapping the interactive digital pet object 1702, the pet module would give those actions more weight in determining the likeability factor. In particular implementations, the pet module may display who the interactive digital pet object 1702 likes or does not like. This information can be used as another source of information that promotes interaction among users. For example, the page owner may comment to another user that his or her interactive digital pet object 1702 appears to like that user.

F. Hot Potato Module

In one implementation, the social network site 20 provides a hot potato module. When invoked, the hot potato module renders an object that is a representation of a hot potato in a hot potato module region. In particular implementations, the hot potato module facilitates social interaction with one another's personal pages by allowing users to throw the hot potato to other users, as described below.

Figure 20:
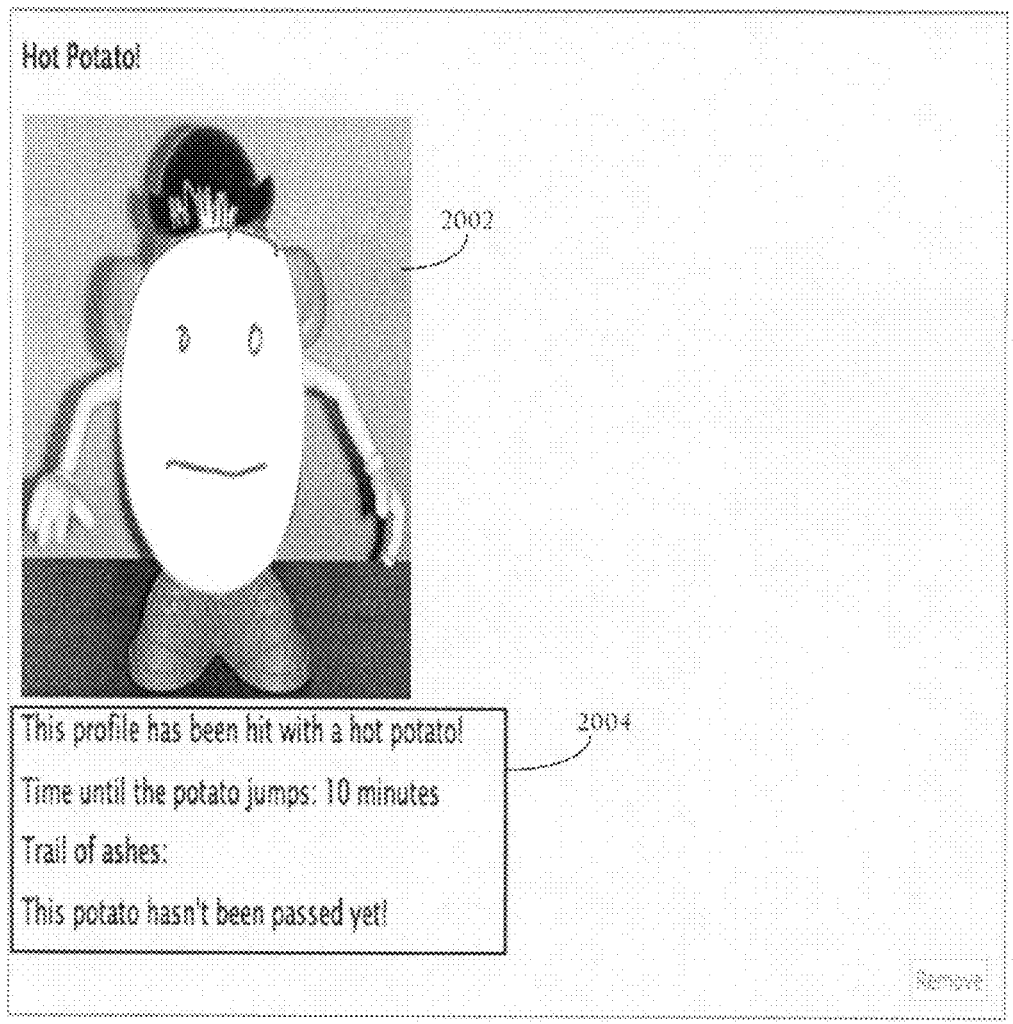
FIG. 20 illustrates a page showing an example semi-autonomous hot potato.

FIG. 20 illustrates a page showing an example semi-autonomous hot potato. As FIG. 20 shows, the hot potato module region displays a hot potato object 2002 and information 2004 associated with the hot potato object 2002. In one implementation, the hot potato module may render the hot potato object 2002 in the hot potato module region as shown. In one implementation, the hot potato module may render the hot potato object 2002 as an overlay to any one or more other module regions. In other words, the rendered hot potato object 2002 need not be rendered in any predefined region. In one implementation, the hot potato module may render other images instead of a potato. For example, the hot potato module may render slime that overlays other module regions. While the hot potato module may render a semi-autonomous hot potato as described herein, the hot potato module may also render an autonomous hot potato such as a rendering involving a rich site summary (RSS) feed renderer, etc.

Figure 21:
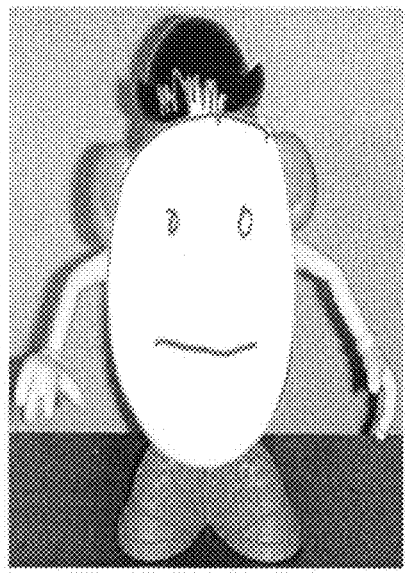
FIG. 21 illustrates a page showing an example hot potato and trail of ashes information.

FIG. 21 illustrates a page showing an example hot potato and trail of ashes information. In one implementation, a trail of ashes list is a list of users having personal pages on which the hot potato object 2002 has been rendered. As FIG. 21 shows, the hot potato module may display the list or trail of ashes. In one implementation, the list may include a number of users up to a predefined limit N (e.g., the last 10 users). FIG. 21 shows one specific implementation of the trail of ashes that is specific to one instance of a hot potato object 2002. In other implementations, different hot potato objects may have different trails of ashes as the hot potato objects travel through different personal pages.

FIG. 22 illustrates a process flow associated with a decision to transfer determining whether to throw a hot potato object 2002. As FIG. 22 shows, in response to a user selecting to throw the hot potato object 2002 to another user, the HTTP server 312 receives a throw request from the client of a user (2202). In one implementation, the throw request may include an editor ID, owner ID, module ID, etc. The page creator 302, responsive to the request, causes the module executer 304 to invoke the hot potato module or code. In one implementation, when the hot potato module is invoked, it randomly selects a contact from the contact list of the user on whose personal page the hot potato object 2002 is rendered (2204). The hot potato module then transfers the hot potato object 2002 to the personal page of the selected user (2206). In one implementation, completion of throwing the hot potato object 2002 to the randomly selected contact may be contingent on having the permissions required to add the hot potato object 2002 to the personal page of that contact. In one implementation, the hot potato module may perform a permission check similar to the permission check described above in connection with FIG. 11. In one implementation, if the thrower does not have the required permission, the hot potato object 2002 may be "deflected" back to the personal page of the thrower. In one implementation, when a user throws the hot potato object 2002 at another user, it is possible that the hot potato module may randomly select the same user. In other words, it is possible that the hot potato object 2002 may get thrown back or stays at the personal page of the user. In one implementation, if the hot potato module transfers a hot potato module to a personal page that already contains a different instance of the potato module, the hot potato module overwrites the older hot potato module with the newer hot potato module. As such, in particular implementation, there is no more hot potatoes on the social network site than the number of personal pages.

In one implementation, if the owner of the current personal page on which the hot potato object 2002 is rendered does not attempt to throw or fails to successfully throw the hot potato object 2002 within a predetermined time period (e.g., 10 minutes), the hot potato module may automatically invoke itself and pass the hot potato object 2002 to a random visitor. In implementation, the hot potato module may pass the hot potato object 2002 in a non-random manner. For example the hot potato module may pass the hot potato object to the first or next visitor of the owner's personal page.

FIG. 23 illustrates a process flow associated with transferring a hot potato object 2002. In one implementation, the hot potato module transfers the hot potato object 2002 from the personal page of one user to that of another user by modifying the layout key of the respective users as described below. The hot potato module first creates a new hot potato key with the target as owner (2302). In one implementation, the target is the randomly selected user described above (step 2204 of FIG. 22), and the editor is the previous owner (e.g., the owner of the personal page from which the hot potato object 2002 is transferred).

The hot potato module then creates a new layout entry to remove the hot potato module from the editor profile associated with the personal page of the editor (previous owner) (2304). The hot potato module then creates a new layout entry to add the hot potato module to the target profile associated with the personal page of the target (new owner) (2306). In one implementation, the value field in the data table may include the latest owner in the trail of ashes list. In one implementation, the value field in the data table may not include the current owner in the list, where the previous owner is added to the trail of ashes list. As described above, the trail of ashes list is a list of users having personal pages on which the hot potato object 2002 has been rendered. In one implementation, the ID if the latest owner is added to a delimited string of user IDs for the last N users hit with the hot potato object 2002.

As described herein, embodiments of the present invention provide an extremely interactive social network site 20 where trusted users may modify not only their own personal page but also the personal pages of other users. These capabilities facilitate and promote interaction among users thereby promoting use of the social network site 20.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims. For example, a user may represent an organization (e.g., school, church, etc.) where the personal page is associated with the organization.

What is claimed is:

1. A method comprising:
providing over a network a personal page corresponding to a first user, wherein the personal page includes a digital pet module region comprising a representation of an animate object, an indicator of a current state of the animate object, an action selector control, and an action history related to the animate object comprising a user identifier of a previous user and an action selected by the previous user using the action selector control in relation to the animate object;
receiving, at a computing device, an indication of a selected action from a current user;
modifying, via the computing device, the state of a digital pet object based on the selected action; and
causing, over the network, a browser client to render the digital pet module region, the modified state, and an updated action history including an identification of the current user and the action selected by the user.

2. The method of claim 1 further comprising:
accessing a data store; and
obtaining state information from the data store for an image of the digital pet object.

3. The method of claim 1 further comprising:
updating a data store by adding a new entry that includes the modified state information.

4. The method of claim 1 further returns a status message to the browser client.

5. The method of claim 1 further comprising displaying state information comprising one or more of a current mood, last action taken and by whom, and a time stamp.

6. The method of claim 1 wherein a user selects the action from a list, wherein the actions on the list comprise feeding, petting, moshing, snorgling, licking, smacking, poking, zapping, and killing the image.

7. The method of claim 1 further comprising determining a likeability factor based for one or more users based on one or more actions taken by the one or more users.

8. A computing device comprising
a non-transitory computer-readable storage medium;
one or more processors;
logic tangibly encoded on said non-transitory computer-readable storage medium for execution by said one or more processors, said logic causing the computing device to:
provide a personal page corresponding to a first user, wherein the personal page includes a digital pet module region comprising a representation of an animate object, an indicator of a current state of the animate object, an action selector control, and an action history related to the animate object comprising a user identifier of a previous user and an action selected by the previous user using the action selector control in relation to the animate object;
receive an indication of a selected action from a current user;
modify the state of a digital pet object based on the selected action; and
cause a browser client to render the digital pet module region, the modified state, and an updated action history including an identification of the current user and the action selected by the user.

9. The computing device of claim 8 wherein the logic is further causes the computing device to:
   access a data store; and
   obtain state information from the data store for an image of the digital pet object.

10. The computing device of claim 8 wherein the logic is further causes the computing device to:
    update a data store by adding a new entry that includes the modified state information.

11. A method comprising:
    providing, via a computing device, a personal page corresponding to a first user, wherein the personal page includes a hot potato object overlaying at least a portion of the personal page;
    responsive to a throw request which is stored within an action history in relation to the hot potato object, randomly selecting, via the computing device, a contact from a contact list of an owner of the personal page; and
    conditionally transferring, over a network, the hot potato object from the first user to a personal page of the selected contact responsive to the throw request.

12. The method of claim 11 further comprising:
    removing a first entry from the data store, wherein the first entry comprises information for rendering the hot potato object on the personal page of the owner; and
    adding a second entry to the data store, wherein the second entry comprises information for rendering the image on the personal page of the selected contact.

13. The method of claim 11 wherein the selecting is initiated by receiving a command from the owner to transfer the hot potato object.

14. The method of claim 11 wherein the selecting is initiated after a predefined time period after rendering the hot potato object on the personal page of the owner.

15. The method of claim 11 further comprising display a list of users having personal pages on which the hot potato object has been rendered.

16. A computing device comprising
    a non-transitory computer-readable storage medium;
    one or more processors;
    logic tangibly encoded on said non-transitory computer-readable storage medium for execution by said one or more processors, said logic causing the computing device to:
    provide a personal page corresponding to a first user, wherein the personal page includes a hot potato object overlaying at least a portion of the personal page;
    responsive to a throw request which is stored within an action history in relation to the hot potato object, randomly select a contact from a contact list of an owner of the personal page; and
    conditionally transfer the hot potato object from the first user to a personal page of the selected contact responsive to the throw request.

17. The computing device of claim 16 wherein the logic is further causes the computing device to:
    remove a first entry from the data store, wherein the first entry comprises information for rendering the hot potato object on the personal page of the owner; and
    add a second entry to the data store, wherein the second entry comprises information for rendering the hot potato object on the personal page of the selected contact.

18. The computing device of claim 16 wherein the selecting is initiated by receiving a command from the owner to transfer the hot potato object.

19. The computing device of claim 16 wherein the selecting is initiated after a predefined time period after rendering the hot potato object on the personal page of the owner.

20. The computing device of claim 16 further comprising display a list of users having personal pages on which the hot potato object has been rendered.

* * * * *